J. H. HOOVER.
MILKING MACHINE.
APPLICATION FILED JAN. 28, 1909.
929,764.
Patented Aug. 3, 1909.
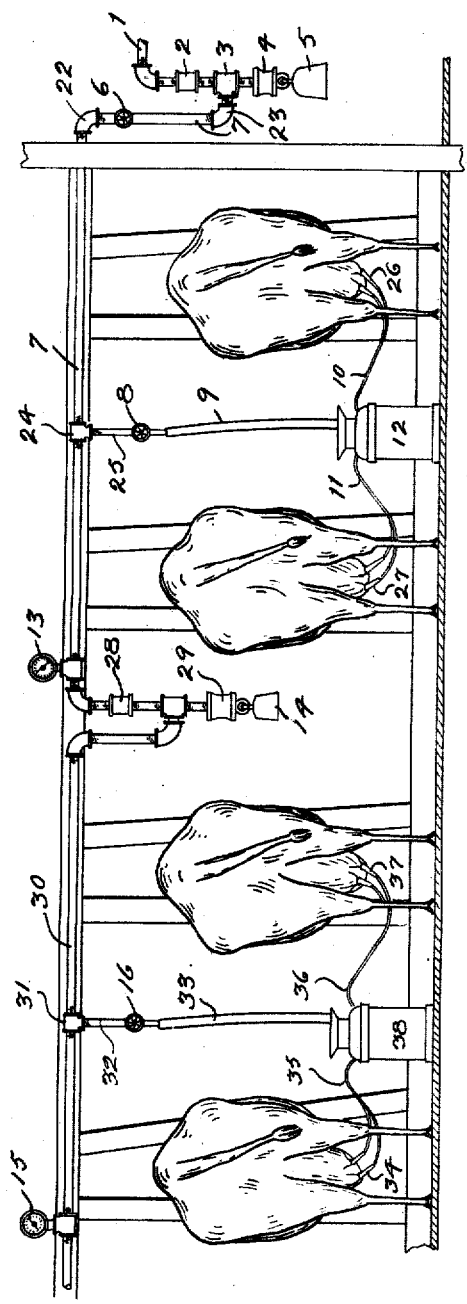
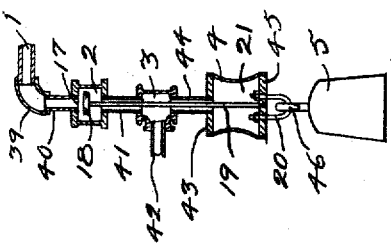
WITNESSES:
H. B. Burr
R. W. Trigo
INVENTOR
J. H. Hoover
BY G. C. Kennedy
ATTORNEY

UNITED STATES PATENT OFFICE.

JOSEPH H. HOOVER, OF WATERLOO, IOWA.

MILKING-MACHINE.

No. 929,764. Specification of Letters Patent. Patented Aug. 3, 1909.

Application filed January 28, 1909. Serial No. 474,650.

*To all whom it may concern:*

Be it known that I, JOSEPH H. HOOVER, a citizen of the United States of America, and a resident of Waterloo, Blackhawk county, Iowa, have invented certain new and useful Improvements in Milking-Machines, of which the following is a specification.

My invention relates to improvements in milking machines, and the objects of my improvements are these: first, to provide means for producing a constant degree of vacuum in the teat-cups of a milking machine, and second, to so adapt such means that the degree of vacuum may be varied at will, whereby two or more of such machines may be connected in series, with the degree of vacuum in the different machines varying from each other in amount as may be predetermined, to cause them to be respectively effective in milking cows which may differ in the amount of suction necessary to be applied to their teats in the milking process. These objects I have accomplished by the means which are hereinafter fully described and claimed, and which are illustrated in the accompanying drawings, in which:

Figure 1 is a front elevation of two of my improved milking machines connected in series and as applied to the teats of cows in the process of milking. Fig. 2 is an enlarged vertical central axial section of the valve-chamber and its immediate communicating connections, and the means for controlling the action of the valve.

Similar numerals refer to similar parts throughout the several views.

Each of my machines is adapted for the milking of two cows, the teat-cups 26 and 27 for such cows leading by means of short hose-connections 10 and 11 respectively to a common closed air-exhausted receptacle 12.

In the event that but one machine is used, the receptacle 12 is placed in communication with a horizontal pipe 7 by means of the intermediate connections which consist of a short hose-connection 9, an inserted pipe 25 provided with a stop-cock 8, and a T-coupling 24. The horizontal pipe 7 is placed in communication with a valve-chamber 2 by means of an elbow 22, a pipe 7 containing a stop-cock 6, an elbow 23, a short tube 42, a T-coupling 3, and a short tube 41. A short tube 40 is in communication at an orifice 17 with said valve-chamber, said tube entering an elbow 39 coupled to a pipe 1 leading to any suitable pump for exhausting the air from said valve-chamber and its connections to said teat-cups. A meter 13 in communication with the pipe 7 may be used to indicate the degree of air-exhaustion in the machine.

A collapsible chamber 21 is supported by and placed in communication with the T-coupling 3 by a short tube 44. The chamber is formed with its upper solid head 43 affixed to the lower end of said tube 44, while its solid lower head 45 is connected with the said upper head by a flexible collapsible jacket 4 to form an air-tight chamber. A weight 5 is provided with a hook 46 whereby it may be detachably suspended from a U-bolt 20 secured to the lower head 45 of the drum 21. A spindle 19 has its lower end secured to the center of the lower head of said drum, and passes upward through the communicating parts 44, 3, and 41 and projects into the valve-chamber 2, and has a valve-head 18 of disk-like form on its upper end, the latter adapted to cover and seal the inlet 17 when drawn upward by the exercise of a certain degree of suction upon it from above.

The degree of exhaustion of air below the valve-head 18 is regulated by suspending a weight 5 of the desired gravity from the drum 21. If, for instance, the weight be ten pounds, the weight will cause the valve-head 18 to drop until the amount of vacuum in the machine exceeds that weight, when the suction overcomes the weight and the weight is drawn up, collapsing the drum 21, and the valve-head closes the inlet 17. As the vacuum decreases in the machine, and falls below ten pounds in amount, the gravity of the weight acts upon the valve to open said inlet to the suction-pipe 1. By changing the weight for one of a different gravity, a desired change may be made in the amount of vacuum pressure in the machine.

The valve and weight act automatically, since they move quickly within very small limits to keep the pressure at approximately the amount desired.

I have shown in Fig. 1 my method of connecting a plurality of my said machines in series, whereby, when weights of different gravities are suspended from the valves of the different machines, they may be caused to act respectively at different pressures of vacuum, in order to successfully milk cows graded according to their several degrees of difficulty in milking. In other words, this arrangement permits of milking a herd, members of which are sensitive to more than a certain small pressure, simultaneously with other members which must have a greater pressure of vacuum supplied. To do this, it is simply requisite to connect up a machine to the suction-pipe 7 of the machine in advance, the second machine being the same in construction and operation as the first-mentioned machine, having a valve-chamber 28, a collapsible drum 29, but having a weight 14 of lesser gravity than the weight 5 on the other machine. The suction-pipe 30 of the second machine is in communication by means of the T-coupling 31, depending pipe 32, stop-valve 16, hose 33, exhausted can 38 and flexible tubes 35 and 36, with the teat-cups 34 and 37 respectively of the second pair of cows. Another gage 15 may be supplied to the suction-pipe 30 to indicate the vacuum-pressure therein.

It is obvious that when the first weight 5 is of a gravity of say ten pounds, and the second weight 14 of a gravity of say six pounds, that the respective machines will operate to maintain the vacuum-pressure in their respective connected teat-cups at ten and six pounds constantly. In the same manner other machines may be connected up, to maintain the same or different pressures in the successive machines, whereby as many cows may be milked simultaneously as desired, notwithstanding the variations in the amount of suction required to milk cows of different degrees of sensitiveness and responsiveness to the action of the apparatus.

The parts of the machine are simple, and easily separated for cleansing or for knocking-down for shipment. The use of a constant pressure in each machine also effects an economy of time in milking, since the draft is constant, and no time is lost in varying the pressure down to a minimum, as is the case with machines having pulsators in connection.

Having described my invention, what I claim as new, and desire to secure by Letters Patent, is:

1. A milking machine, comprising teat-cups, a valve-chamber having an inlet-port in communication with some suitable means for exhausting air therefrom, a valve-head mounted on a stem, the latter passing movably through a bearing-opening in said chamber, a weight removably connected to the portion of said valve-stem which is without said chamber, and communicating connections between said valve-chamber and said teat-cups, said valve-head being adapted to rise to close the inlet-port to said valve-chamber when the degree of air-exhaustion in said chamber is sufficient to overcome the resistance caused by the gravity of said weight.

2. A milking machine, comprising teat-cups, a valve-chamber having an inlet-port in communication with some suitable means for exhausting air therefrom, a valve-head mounted on a stem, a chamber in communication with said valve-chamber and having upper and lower solid heads connected by collapsible walls, one of said heads being secured fixedly to said valve-chamber, the other head being movable, said valve-stem passing through said valve-chamber and said collapsible chamber and being secured to the movable head of the latter to move therewith, a weight removably suspended from the movable head of said collapsible chamber, and communicating connections between said valve-chamber and said teat-cups, said walls of the collapsible chamber being adapted to collapse and draw up said weight and cause the valve-head to rise and close the inlet-port in said valve-chamber when the degree of exhaustion of air produced in the apparatus becomes sufficient to overcome the resistance caused by the gravity of said weight.

3. A milking machine, comprising a valve-chamber having an inlet-port in communication with some suitable means for exhausting the air from said chamber, a valve in said chamber adapted to move to close said port, a removable weight outside of said chamber connected to said valve by means movable through a bearing-opening in the chamber, a second valve-chamber having an inlet-port, means of communication between the first-mentioned valve-chamber and the inlet-port in the second-mentioned valve-chamber, a valve in the second-mentioned valve-chamber adapted to move to close the inlet-port therein, a removable weight of less heaviness than the first-mentioned weight located outside of said second-mentioned valve-chamber connected to the valve therein by means movable through a bearing-opening in the chamber, and a plurality of teat-cups located near to each of said valve-chambers and in communication therewith.

4. A milking machine, comprising a valve-chamber having an inlet-port in communication with some suitable means for exhausting the air from said chamber, a valve in said chamber adapted to close said port, said valve having a depending stem, a chamber in communication with said valve-chamber and having upper and lower solid heads connected by collapsible walls, one of said heads being fixedly supported by said valve-chamber, the other head being movable, said valve-stem passing through said valve-chamber and said collapsible chamber and being secured to the movable head of the latter to move therewith, a weight removably suspended from the movable head of said collapsible chamber, said walls of said collapsible chamber being adapted to collapse and draw up said movable head and its attached weight and cause said valve to close said inlet-port when the degree of exhaustion of air in the apparatus exceeds the tension upon the valve produced by the gravity of the weight, a second valve-chamber having an inlet-port, means of communication between the first-mentioned valve-chamber and the inlet-port in said second-mentioned valve-chamber, a valve in said second-mentioned valve-chamber adapted to close its said inlet-port, said valve having a depending stem, a chamber in communication with said valve-chamber and having upper and lower solid heads connected by collapsible walls, one of said heads being fixedly supported by said valve-chamber, the other head being movable, said valve-stem passing through said valve-chamber and said collapsible chamber and being secured to the movable head of the latter to move therewith, a weight of lesser gravity than the first-mentioned weight on the first-mentioned collapsible chamber removably suspended from the movable head of said second-mentioned collapsible chamber, said walls of the latter collapsible chamber being adapted to collapse and draw up said movable head and its attached weight and cause said valve to close its adjacent inlet-port when the degree of exhaustion of air in the second-mentioned valve-chamber exceeds the tension upon its valve produced by the gravity of the attached second-mentioned weight, a plurality of teat-cups in communication with said first-mentioned valve-chamber only and a plurality of teat-cups in communication with said second-mentioned valve-chamber only.

5. A milking-machine, comprising a valve-chamber having a port in communication with some suitable means for exhausting the air from the chamber, a valve movable in said chamber to close said port, a plurality of similar valve-chambers provided with inlet-ports and similar valves adapted to move to close the ports, each of said plurality of valve-chambers being in serial communication with all the others, by means of their said inlet-ports, a stem on each valve adapted to work through the wall of its inclosing chamber, a weight removably suspended from each valve-stem without its chamber, the weight supported by the first-mentioned valve being heaviest, and the weights suspended form the other succeeding valves in progression being respectively lighter than the first-mentioned weight and than each other, and teat-cups in independent communication with each of said valve-chambers.

6. A milking machine, comprising a valve-chamber having a port in communication with some suitable means for exhausting the air from the chamber, a valve movable in said chamber to close said port and provided with a depending stem, a chamber in communication with said valve-chamber and having upper and lower solid heads connected by collapsible walls, one of said heads being fixedly supported by said valve-chamber, the other head being movable, said valve-stem passing through said valve-chamber and said collapsible chamber and being secured to the movable head of the latter to move therewith, a weight removably suspended from the movable head of said collapsible chamber, said walls of said collapsible chamber being adapted to collapse and draw up said movable head and its attached weight and cause said valve to close said port when the degree of exhaustion of air in the valve-chamber exceeds the tension upon its valve produced by the gravity of the weight, a plurality of similar valve-chambers provided with inlet-ports and similar valves adapted to move to close the ports, each of said plurality of valve-chambers being in serial communication with all of the others by means of their said inlet-ports, a depending stem on each valve, connected to the movable head of a similar collapsible chamber, a weight removably suspended from the movable head of each collapsible chamber, the weight supported by the first-mentioned valve being the heaviest, and the weights suspended from the other valves when different from each other and from the first, being of less gravity in ranging away from the first-mentioned weight or adjacent weights in advance, and teat-cups independently placed in communication with each of said valve-chambers.

Signed at Waterloo, Iowa, this 11th day of Jan., 1909.

JOSEPH H. HOOVER.

Witnesses:
O. D. YOUNG,
G. C. KENNEDY.